US012681156B2

(12) United States Patent
Zhao

(10) Patent No.: US 12,681,156 B2
(45) Date of Patent: Jul. 14, 2026

(54) METHOD AND APPARATUS FOR SENDING RANGING SIGNAL, METHOD AND APPARATUS FOR RECEIVING RANGING SIGNAL, DEVICES AND READABLE STORAGE MEDIUM

(71) Applicant: BEIJING XIAOMI MOBILE SOFTWARE CO., LTD., Beijing (CN)

(72) Inventor: Qun Zhao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 356 days.

(21) Appl. No.: 18/018,984

(22) PCT Filed: Aug. 6, 2020

(86) PCT No.: PCT/CN2020/107503
§ 371 (c)(1),
(2) Date: Jan. 31, 2023

(87) PCT Pub. No.: WO2022/027477
PCT Pub. Date: Feb. 10, 2022

(65) Prior Publication Data
US 2023/0280453 A1 Sep. 7, 2023

(51) Int. Cl.
*G01S 11/02* (2010.01)
*H04W 72/25* (2023.01)

(52) U.S. Cl.
CPC .............. *G01S 11/02* (2013.01); *H04W 72/25* (2023.01)

(58) Field of Classification Search
CPC ...... G01S 11/02; G01S 5/0205; G01S 5/0072;
G01S 2205/01; H04W 72/25; H04W 24/08; H04W 76/14; H04W 76/23; H04L 5/0053; H04L 5/0094
See application file for complete search history.

(56) References Cited

U.S. PATENT DOCUMENTS

| | | | | |
|---|---|---|---|---|
| 11,539,490 | B2 * | 12/2022 | Cai | ....................... H04W 72/21 |
| 2017/0289733 | A1 * | 10/2017 | Rajagopal | ............. H04L 5/0082 |
| 2018/0098299 | A1 * | 4/2018 | Chae | ........................ H04J 11/00 |
| 2020/0187145 | A1 * | 6/2020 | Chae | ....................... H04W 4/70 |

FOREIGN PATENT DOCUMENTS

| | | | |
|---|---|---|---|
| CN | 107439033 | A | 12/2017 |
| CN | 111213393 | A | 5/2020 |

OTHER PUBLICATIONS

PCT/CN2020/107503 English translation of International Search Report dated Apr. 27, 2021, 2 pages.

* cited by examiner

*Primary Examiner* — Resha Desai
*Assistant Examiner* — Naomi M Wolford
(74) *Attorney, Agent, or Firm* — Cozen O'Connor

(57) ABSTRACT

A method for sending a ranging signal performed by a first terminal includes determining first indication information for sending a first ranging signal. The first indication information is configured to indicate a transmission parameter of the first ranging signal, and the transmission parameter includes at least one of a time-frequency resource or a physical layer parameter for sending the first ranging signal. The method further includes sending the first ranging signal to a second terminal based on the transmission parameter.

18 Claims, 5 Drawing Sheets determining first indication information for sending the first ranging signal, in which, the first indication information is configured to indicate a transmission parameter of the first ranging signal —— 201 sending the first ranging signal to the second terminal based on the transmission parameter —— 202

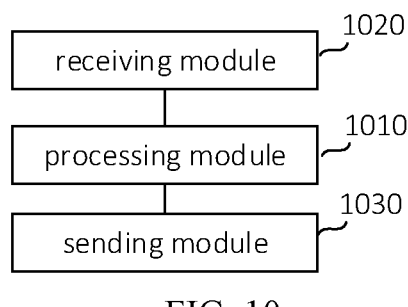
FIG. 10
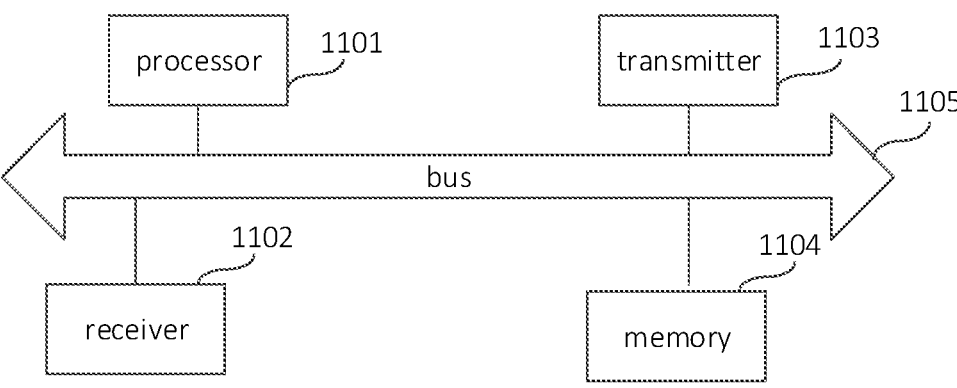
FIG. 11
FIG. 12

METHOD AND APPARATUS FOR SENDING RANGING SIGNAL, METHOD AND APPARATUS FOR RECEIVING RANGING SIGNAL, DEVICES AND READABLE STORAGE MEDIUM

CROSS-REFERENCE TO RELATED APPLICATION

This application is a national phase of International Application No. PCT/CN2020/107503, filed on Aug. 6, 2020, the content of which is hereby incorporated by reference in its entirety.

TECHNICAL FIELD

The disclosure relates to a field of communications, and particularly to a method and an apparatus for sending and receiving a ranging signal, a device and a computer storage medium.

BACKGROUND

As applications that detect and/or use a distance and an angle between user equipments (UEs) are rapidly developing, a terminal supporting a ranging function may perform control and operation more conveniently. This may expand function modes in various application scenarios, such as a commodity display scenario, a smart home scenario and a smart city scenario.

In the related art, a distance and angle measurement by means of a sidelink between users has been implemented in wireless fidelity network (WiFi), ultra wide band (UWB), bluetooth and other local area communication technologies.

SUMMARY

In a first aspect of the disclosure, a method for sending a ranging signal is provided, which is performed by a first terminal. The method includes:

determining first indication information for sending a first ranging signal, in which the first indication information is configured to indicate a transmission parameter of the first ranging signal, in which the transmission parameter includes at least one of a time-frequency resource or a physical layer parameter for sending the first ranging signal; and sending the first ranging signal to a second terminal based on the transmission parameter.

In a second aspect of the disclosure, a method for receiving a ranging signal is provided, which is performed by a second terminal. The method includes:

determining first indication information for receiving a first ranging signal, in which the first indication information is configured to indicate a transmission parameter of the first ranging signal, in which the transmission parameter includes at least one of a time-frequency resource or a physical layer parameter for receiving the first ranging signal; and receiving the first ranging signal sent by a first terminal based on the transmission parameter.

In a third aspect of the disclosure, a terminal is provided. The terminal includes:

a processor;

a transceiver connected to the processor; and a memory configured to store an executable signaling of the processor;

in which, the processor is configured to load and execute executable instructions to implement the method for sending a ranging signal or the method for receiving a ranging signal as described in the above embodiments.

In a fourth aspect of the disclosure, a computer readable storage medium is provided. The computer readable storage medium stores at least one instruction, at least one program, a code set and an instruction set, the at least one instruction, the at least one program, the code set or the instruction set being loaded and executed by a processor to implement the method for sending a ranging signal or the method for receiving a ranging signal as described in the above embodiments.

BRIEF DESCRIPTION OF THE DRAWINGS

In order to explain the technical solutions in embodiments of the disclosure more clearly, the drawings described in the embodiments will be briefly introduced below. Obviously, the drawings described as below are only some embodiments of the disclosure. Those skilled in the art may obtain other drawings from these drawings without creative work.

FIG. 10 is a block diagram illustrating a structure of an apparatus for receiving a ranging signal according to some embodiments.

FIG. 11 is a block diagram illustrating a structure of a terminal according to some embodiments.

FIG. 12 is a block diagram illustrating a structure of a network device according to some embodiments.

DETAILED DESCRIPTION

In order to make the purpose, technical solutions and advantages of the disclosure more clear, the embodiments of the disclosure will be further described below in connection with the accompanying drawings.

Figure 1:
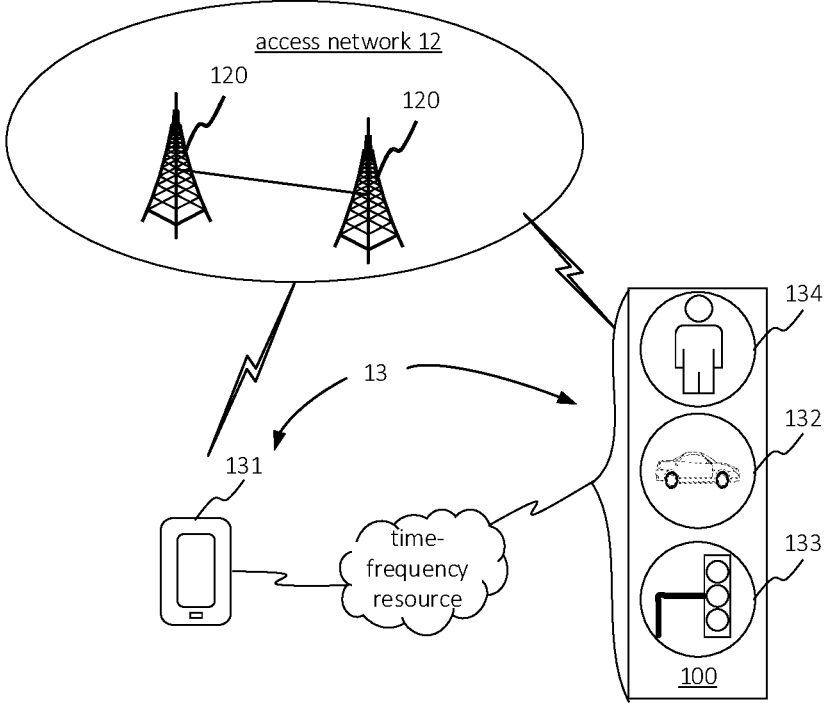
FIG. 1 is a block diagram illustrating a communication system according to some embodiments.

FIG. 1 is a block diagram illustrating a communication system according to a schematic embodiment. The communication system may include an access network 12 and a terminal 13.

The access network 12 includes several access network devices 120. The access network device 120 may be a base station (BS). The base station is an apparatus deployed in an access network to provide wireless communication function for a terminal. The base station may include various forms of macro base stations, micro base stations, relay stations, access points, etc. In a system adopting different radio access technologies, the name of the devices with a base station function may vary. For example, in a long term evolution (LTE) system, it is referred to as eNodeB or eNB; in a 5G NR system, it is referred to as gNodeB or gNB. With evolution of a communication technology, the name of "base station" may vary. For convenience of description, in embodiments of the disclosure, the above apparatus that provides wireless communication function for a terminal is collectively referred to as an access network device.

A terminal 13 may include various handheld devices with a wireless communication function, vehicle devices, wearable devices, computing devices or other processing devices connected to wireless modems, as well as various forms of user equipments (UE), mobile stations (MS), terminals, etc. For convenience of description, the device mentioned above is collectively referred to as a terminal. The access network device 120 and the terminal 13 communicate with each other through some kind of air interface technology, for example, a Uu interface.

In embodiments of the disclosure, the terminal 13 includes a vehicle 131, other vehicle 132, infrastructure 133 and a pedestrian 134.

Vehicle to vehicle (V2V) refers to communication between the vehicle 131 and the other vehicle 132. A vehicle of one party sends related information to a vehicle of the other party, and the related information includes a driving speed, a geographic position, a driving direction, a driving state, etc.

Vehicle to infrastructure (V2I) refers to communication between the vehicle 131 and the infrastructure 133. The infrastructure 133 includes all infrastructure encountered in a driving process of the vehicle, including building facilities such as traffic lights, bus stations, buildings and tunnels.

Vehicle to pedestrian (V2P) refers to communication between the vehicle 131 and the pedestrian 134. A pedestrian generally refers to an electronic device having a mobile communication capability and carried by a pedestrian, and for example, a mobile phone and a wearable device. The wearable device includes a smart wristband, a smart watch, a smart ring, etc.

In embodiments of the disclosure, for an example, the vehicle 131 is referred to as a first terminal, and the other vehicle 132, the infrastructure 133, and the pedestrian 134 are referred to as second terminals, both of which may be exchanged, which are not limited here.

Optionally, the first terminal and the second terminal are terminals that support sidelink communication, and the communication systems may be an NR system and a subsequent evolution system.

In an R16 NR sidelink communication system, a time-frequency resource is allocated to a user equipment (UE) for sidelink communication by configuring or pre-configuring parameters such as a sidelink bandwidth part (BWP) and a sidelink resource pool on a sidelink communication carrier frequency. The BWP formulates a subcarrier interval, a cyclic prefix (CP) and a continuous frequency domain resource position used by the UE for sidelink communication. A sidelink communication resource pool is defined at the continuous frequency domain resource position specified by the BWP, and a time-frequency resource range that may be used by the user equipment to send/receive a sidelink communication signal is further determined.

A ranging requirement by means of the sidelink signal is not taken into account in an existing NR sidelink communication system. Therefore, a physical layer signal transmission for ranging needs to be redefined. A ranging signal is transmitted from a sending user equipment to a receiving user equipment, and a relative position or a distance between the sending user equipment and the receiving user equipment is estimated by sending and/or receiving the measurement of the ranging signal by the user equipment. From the perspective of a receiving terminal, the receiving terminal needs to know in advance some physical layer parameters of the ranging signal sent by a sending terminal, such as a signal format, a signal bandwidth, a time-frequency resource position used for signal transmission and a signal power, to facilitate reception and measurement. Compared with blind detection, the receiving terminal knowing the information in advance may greatly reduce the processing complexity and the energy consumption of the receiving terminal.

Figure 2:
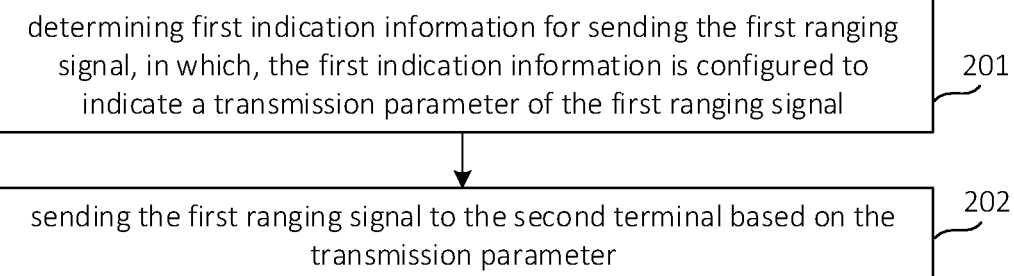
FIG. 2 is a flowchart illustrating a method for sending a ranging signal according to some embodiments.

FIG. 2 is a flowchart illustrating a method for sending a ranging signal according to some embodiments. As illustrated in FIG. 2, taking the method being performed by a first terminal device as an example, the method includes the following steps.

At step 201, first indication information for sending the first ranging signal is determined. The first indication information is configured to indicate a transmission parameter of the first ranging signal.

The transmission parameter may include a time-frequency resource and/or a physical layer parameter for sending the first ranging signal.

Optionally, the first indication information indicates the transmission parameter in an explicit or implicit manner. Schematically, the first indication information indicates the transmission parameter of the first ranging signal by at least one of:

a first indication field in the first indication information (in an explicit indication manner); or, a first format corresponding to the first indication information (in an implicit indication manner); or, a first channel parameter corresponding to a physical layer channel for transmitting the first indication information (in an implicit indication manner), for example, a specified format corresponding to a demodulated reference signal of a physical layer channel for transmitting the first indication information; or, a specified sequence corresponding to a demodulated reference signal of a physical layer channel for transmitting the first indication information, etc.

When the first terminal determines the transmission parameter of the first ranging signal, it includes any one of the following situations. First, the first terminal itself determines the transmission parameter of the first ranging signal, and indicates the transmission parameter to the second terminal;

In other words, the first terminal may generate first indication information for sending the first ranging signal, and send the first indication information to the second terminal.

That is, when the first terminal needs to determine a distance with the second terminal, the transmission parameter of the first ranging signal is determined first, and the first indication information is sent to the second terminal. The first indication information is configured to indicate the transmission parameter of the first ranging signal. Thus, the second terminal determines the transmission parameter of the first ranging signal based on the first indication information received, and receives the first ranging signal based on the transmission parameter.

Optionally, the first terminal determines the transmission parameter based on a ranging request sent by the second terminal; or, the first terminal determines the transmission parameter based on the ranging signal generated by the device.

Optionally, the first indication information is indicated by sidelink control information (SCI), that is, the first terminal sends the SCI to the second terminal. The SCI is configured to indicate the transmission parameter of the first ranging signal.

In an embodiment, the transmission parameter indicated by the first ranging signal includes control information indicating the first terminal to send the first ranging signal to the second terminal; and/or, resource information about a time-frequency resource occupied by the first ranging signal. Optionally, the transmission parameter may further include a physical layer parameter for transmitting the first ranging signal. That is, the transmission parameter is configured to indicate whether the first terminal sends the ranging signal to the second terminal, and/or, a time-frequency resource and/or a physical layer parameter of the first ranging signal sent by the first terminal to the second terminal.

1.1 When control information indicates the first terminal to send the first ranging signal to the second terminal, the first indication information is indicated in an explicit indication manner or in an implicit indication manner.

When the first indication information is indicated in an explicit indication manner, the SCI may include a first indication field. The first indication field is configured to indicate whether the first terminal sends the first ranging signal to the second terminal. When the first indication information indicates in an implicit indication manner, the SCI may have a corresponding first format. The first format is configured to indicate that the first terminal sends the first indication information to the second terminal. That is, when the SCI has a corresponding other format, it indicates that the first terminal does not send the first ranging signal to the second terminal. Alternatively, a physical layer channel for transmitting the SCI may have a corresponding first channel parameter. The first channel parameter is configured to indicate that the first terminal sends the first ranging signal to the second terminal. In other words, when the physical layer channel has corresponding other channel parameters, it indicates that the first terminal does not send the first ranging signal to the second terminal. Schematically, the demodulated reference signal of the physical layer channel for transmitting the SCI may have a corresponding second format. The second format is configured to indicate that the first terminal sends the first ranging signal to the second terminal. That is, when the demodulated reference signal of the physical layer channel corresponds to other formats, it indicates that the first terminal does not send the first ranging signal to the second terminal. Alternatively, the demodulated reference signal of the physical layer channel for transmitting the SCI may correspond to a first sequence. The first sequence is configured to indicate that the first terminal sends the first ranging signal to the second terminal. That is, when the demodulated reference signal of the physical layer channel corresponds to other sequences, it indicates that the first terminal does not send the first ranging signal to the second terminal.

1.2 The transmission parameter of the first ranging signal includes resource information about a time-frequency resource occupied by the first ranging signal.

The indication of the time-frequency resource includes at least one of the following situations.

1.2.1 Resource information about the time-frequency resource occupied by the first ranging signal indicates a first frequency-domain resource used for transmission associated with the first indication information. The first ranging signal is transmitted via the first frequency-domain resource.

Optionally, the first ranging signal is transmitted via all or a part of the first frequency domain resource.

Schematically, taking the first indication information being implemented as sidelink control information (SCI) as an example, the SCI indicates that the first frequency domain resource used for transmission of the first ranging signal is a frequency domain resource used for the transmission associated with the SCI.

Optionally, transmission of the SCI indicates the first time-frequency resource information occupied by other sidelink transmissions, for example, a position and/or a size of the time-frequency resource, and the first ranging signal is transmitted via a part of the first time-frequency resource. That is, the second terminal as the receiving terminal acquires the time-frequency resource used by the first ranging signal based on the first time-frequency resource indicated by the SCI.

Figure 3:
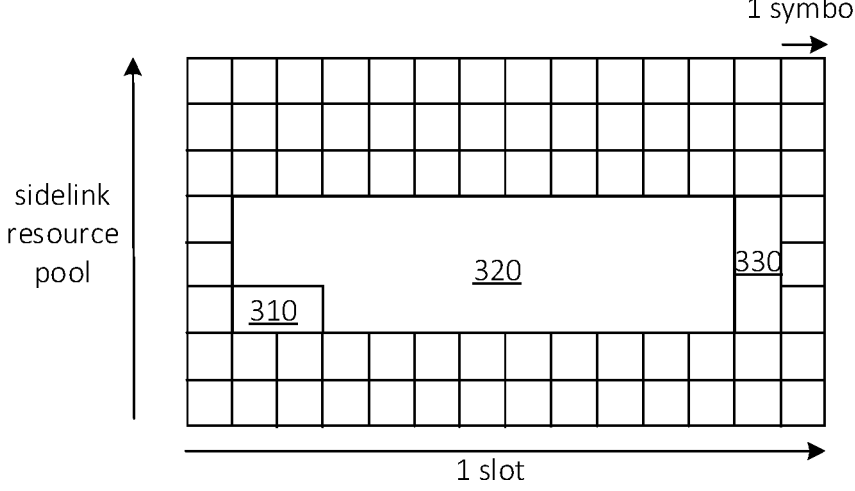
FIG. 3 is a diagram illustrating determining a time-frequency resource for transmitting a ranging signal based on transmission associated with SCI provided in embodiments as illustrated in FIG. 2.

Schematically, FIG. 3 illustrates one sidelink transmission in one time unit in a sidelink resource pool. The sidelink transmission includes a transmission part 310 of a physical sidelink control channel (PSCCH) carrying a part of SCI, a transmission part 320 of a physical sidelink shared channel (PSSCH) carrying data associated with SCI and another part of SCI, and a transmission part 330 of a ranging signal associated with SCI. Similar with R16 NR V2X, the SCI explicitly indicates a size and an initial position of the frequency resource occupied by the sidelink transmission (that is, continuously occupying three sub-channels from a third sub-channel).

In determining the time domain resource, first, a protocol specifies the sidelink data transmission and the SCI transmission occupy the same time resource in the same slot.

Second, a specific time domain resource position is specified by the protocol, or is configured, or is indicated by the first terminal. The first ranging signal occupies a time domain resource of an orthogonal frequency division multiplexing (OFDM) symbol according to the protocol or the configuration information, and is transmitted via the last OFDM symbol other than a guard interval, in which case, the time domain resource lower than that used by the ranging signal is obtained by the time domain resource used for sidelink transmission. When the second terminal as the receiving end receives the SCI indicating that the first ranging signal is transmitted together with the SCI transmission, the receiving terminal determines a specific time-frequency resource position of the first ranging signal according to the information of the sidelink transmission time frequency resource indicated in the SCI.

When the time-frequency resource position used by the first ranging signal is variable in an indicated time-frequency resource, a transmission protocol of the SCI additionally indicates the position of the first ranging signal in the indicated time-frequency resource of sidelink transmission.

1.2.2 Resource information about the time-frequency resource occupied by the first ranging signal indicates a reserved time-frequency resource. The first ranging signal is transmitted via a part of the reserved time-frequency resource. The reserved time-frequency resource is a time-frequency resource used for a subsequent sidelink transmission.

For example, taking the first indication information being implemented as SCI as an example, the current sidelink communication supports indicating a time-frequency resource used in a future sidelink transmission in the SCI of a current sidelink transmission. The transmission of the SCI indicates reserved time-frequency resource information occupied by the future sidelink transmission, for example, the position and/or the size of the time-frequency resource, and the first ranging signal is transmitted via the part of the reserved time-frequency resource. That is, the second terminal as the receiving terminal acquires the time-frequency resource used by the first ranging signal based on the reserved time-frequency resource indicated by the SCI.

The time-frequency resource position used by the first ranging signal is indicated in an explicit or implicit manner.

When the position of the time-frequency resource used by the first ranging signal is variable in the reserved time-frequency resource, the SCI includes explicit time-frequency resource indication information indicating the position and the size of the specific time-frequency resource of the first ranging signal.

When the SCI simultaneously includes a time-frequency resource indication in a current transmission and a reserved time-frequency resource indication in a future transmission, whether to send the ranging signal in the current sidelink transmission and the future reserved transmission are respectively indicated. For example, one SCI in R16 NR V2X may include an indication of a time-frequency resource in a current transmission and an indication of a reserved resource in future two sidelink transmissions; three bits are used to indicate respectively whether the ranging signal is sent in the current sidelink transmission and/or in the future sidelink transmission.

1.2.3 Resource information about the time-frequency resource occupied by the first ranging signal indicates a second time-frequency domain resource. The second time-frequency domain resource is a time-frequency domain resource for transmitting the first ranging signal.

Optionally, the second time-frequency resource is indicated based on a sidelink resource pool transmitting the first indication information; or, the second time-frequency resource is indicated based on a sidelink bandwidth part (BWP) transmitting the first indication information; or, the second time-frequency resource is indicated based on a resource index of a ranging resource.

Schematically, taking the first indication information being SCI as an example, sending of the SCI directly indicates a position and/or a size of the time-frequency domain resource used for transmitting the first ranging signal.

Optionally, the second time-frequency resource is indicated based on the sidelink resource pool of the SCI; or, the second time-frequency resource is indicated based on the sidelink bandwidth part (BWP) of the SCI; or, the second time-frequency resource is indicated based on the resource index of the ranging resource.

The above three manners are illustrated as below.

Figure 4:
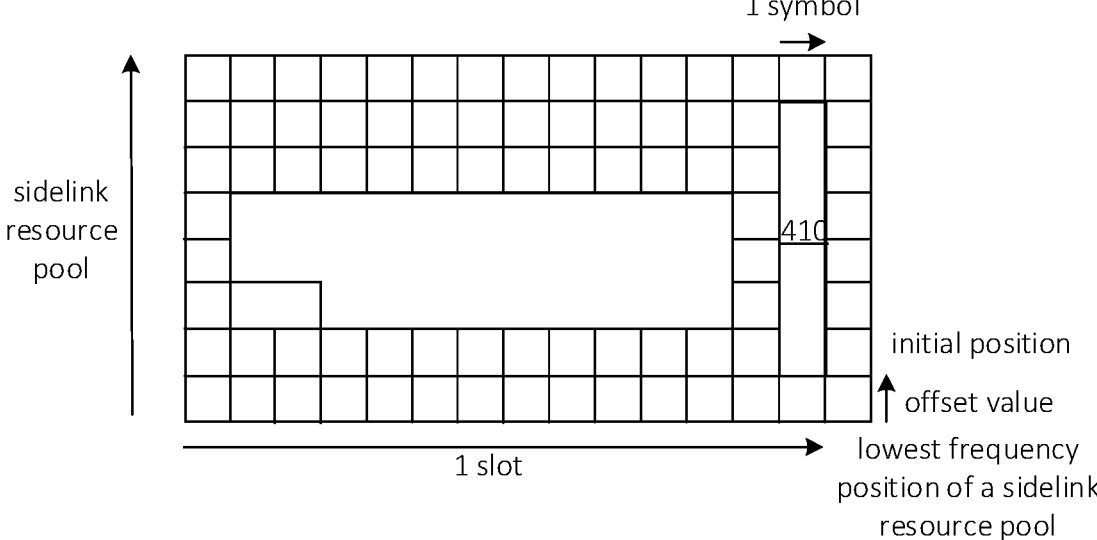
FIG. 4 is a diagram illustrating indicating a second time-frequency resource to determine a time-frequency resource for transmitting a ranging signal based on a sidelink resource pool based on SCI provided in embodiments as illustrated in FIG. 2.
Figure 5:
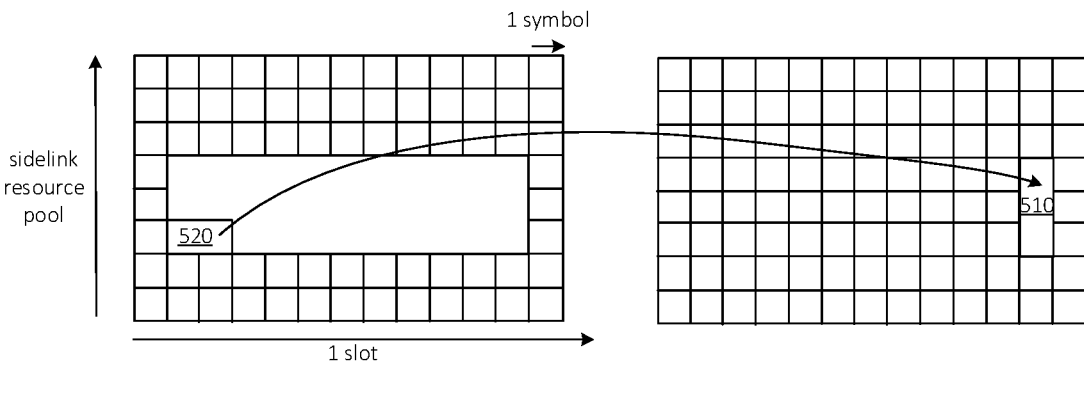
FIG. 5 is a diagram illustrating indicating a second time-frequency resource to determine a time-frequency resource for transmitting a ranging signal based on a sidelink resource pool based on SCI provided in embodiments as illustrated in FIG. 2.

The first manner is that the sidelink resource pool based on SCI indicates the second time-frequency resource. The time-frequency resource used by the first ranging signal belongs to a sidelink resource pool the SCI transmission belongs to. Schematically, as illustrated in FIG. 4, a bandwidth of a first ranging signal 410 exceeds a bandwidth used by the transmission associated with the SCI. A frequency domain initial position of the frequency resource used by the first ranging signal is indicated in the SCI, and the frequency domain initial position is represented by an offset value between the frequency domain initial position and a lowest frequency domain position of the sidelink resource pool. As illustrated in FIG. 4, the frequency domain initial position of the first ranging signal 410 is a second sub-channel. As illustrated in FIG. 5, the time resource used by the first ranging signal 510 exceeds a time resource used by associated data transmission. A time resource indication of the first ranging signal is included in sidelink control information (SCI) 520. Schematically, the offset value with the time resource used in the SCI/associated data transmission indicates the time resource of the first ranging signal. The offset value is indicated by a number of virtual slots/a number of virtual symbols. The virtual slots/symbols refers to slots or OFDM symbols included in the sidelink resource pool.

The second manner is that the BWP based on SCI indicates the second time-frequency resource. The time-frequency resource of the ranging signal may exceed a sidelink resource pool used by SCI transmission but uses the BWP that is also used for transmitting the control information. The time-frequency resource indicates a BWP used based on the SCI. For example, the offset value of the frequency domain initial position relative to the BWP indicates the frequency domain initial position of the first ranging signal. The subcarrier interval of the BWP used by the sidelink control information indicates a frequency domain width occupied by the ranging signal, and a transmission time interval between the first ranging signal and the SCI transmission is indicated by the slot corresponding to the BWP and an OFDM symbol length.

Optionally, the time-frequency resource of the first ranging signal uses a BWP different from that for transmitting the SCI.

The third manner is that a resource index based on a ranging resource indicates the second time-frequency resource. Optionally, a terminal is configured with a periodic ranging signal time-frequency resource set, and the time-frequency resource set in each period includes N orthogonal ranging signal transmission resources. The N resources are mapped to N resource indexes specified by the protocol or by configuration, and for example, the transmission resources are sorted according to the time domain first and then the frequency domain, and then are sequentially mapped to the resource indexes. The transmission time-frequency resource of the specific first ranging signal may be indicated by indicating the resource indexes.

Figure 6:
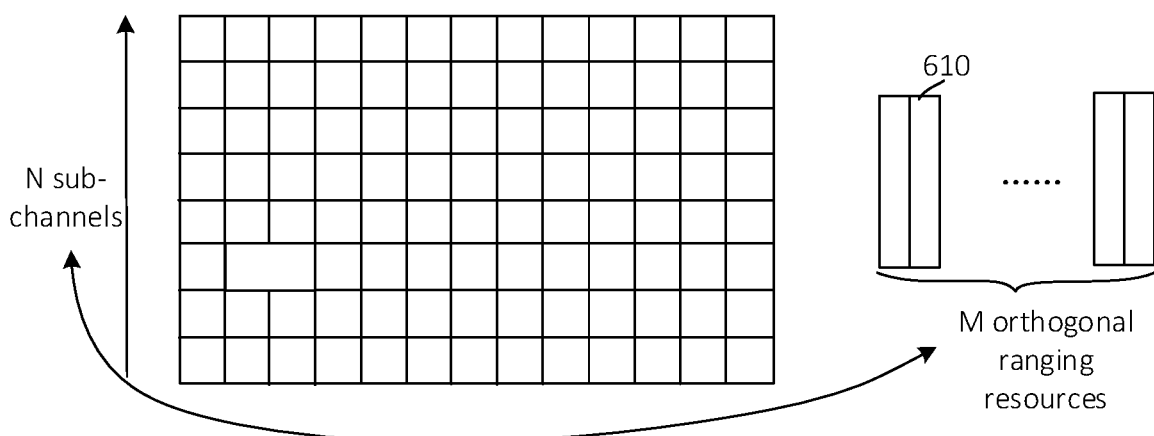
FIG. 6 is a diagram illustrating implicitly indicating a resource signal by means of a frequency domain resource position of a PSCCH provided in embodiments as illustrated in FIG. 2.

The indication of the resource signal is explicit, for example, an information domain indication in SCI; or the indication of the resource signal is implicit, for example, a frequency domain resource used by PSCCH transmission carrying SCI. For example, FIG. 6 illustrates an example of an implicit indication at a PSCCH frequency domain resource position. There are N sub-channels on the frequency domain of the sidelink resource pool, and the PSCCH may only appear at a specific position in a sub-channel. Therefore, given a time unit, the PSCCH may appear at the N frequency domain positions. Assuming that there are M orthogonal ranging resources 610 in a ranging resource set, the frequency domain position of one PSCCH may correspond to $\lfloor M/N \rfloor$ ranging resources ($\lfloor \ \rfloor$ indicates rounding down). Then, the ranging resources may be indicated by the following Equation I.

$$\text{index}=\lfloor M/N \rfloor * n + \text{Offset} + k, \ k < \lfloor M/N \rfloor \qquad \text{Equation I:}$$

n is a frequency-domain sub-channel resource used by the PSCCH, Offset is acquired via a downlink signaling of the base station or pre-configuration, k may be explicitly indicated by sidelink control information, and index is a ranging resource.

1.3 Physical layer parameter information used by an associated first ranging signal is indicated in transmission of the SCI.

The physical layer parameter information includes at least one of: a sending power indication of the first ranging signal; a BWP indication of the first ranging signal; a format of the first ranging signal; priority information of the first ranging signal; a retransmission number of times of the first ranging signal; or a measurement precision requirement of the ranging.

Second, the first terminal receives first indication information sent by the second terminal. The first indication information is configured to indicate the transmission parameter of the first ranging signal.

That is, when the second terminal needs to determine a distance with the first terminal, the transmission parameter of the first ranging signal is determined first, and the first indication information is sent to the first terminal. The first indication information is configured to indicate the transmission parameter of the first ranging signal. Thus, the first terminal determines the transmission parameter of the first ranging signal based on the first indication information received, and sends the first ranging signal based on the transmission parameter.

It needs to be noted that, the first indication information is implemented as schedule information sent by the second terminal to the first terminal, which is configured to schedule the first terminal to send the first ranging signal.

Optionally, the second terminal determines the transmission parameter based on the ranging request sent by the first terminal; or, the first terminal determines the transmission parameter based on the ranging signal generated by the device.

Optionally, the first indication information is indicated by sidelink control information (SCI), that is, the second terminal sends the SCI to the first terminal, and the first terminal receives the SCI sent by the second terminal. The SCI is configured to indicate the transmission parameter of the first ranging signal.

The content indicated by the first ranging signal includes control information indicating the first terminal to send the first ranging signal to the second terminal; and/or, resource information about the time-frequency resource occupied by the first ranging signal. The transmission parameter further includes a physical layer parameter for transmitting the first ranging signal.

Optionally, transmission of the first indication information indicates the time-frequency resource used by the first terminal to transmit the first ranging signal.

The indication of the time-frequency resource includes at least one of the followings.

2.1 Transmission of the SCI indicates time-frequency resource information occupied by other sidelink transmission of the first terminal. The first ranging signal is transmitted via a part of the time-frequency domain resource. That is, it corresponds to the process 1.2.1.

2.2 Sending of the SCI directly indicates the time-frequency resource used by the first terminal to send the first ranging signal, which corresponds to the process 1.2.3.

2.3 Sending of the SCI indicates a limitation of the time-frequency resource for the first terminal to send the first ranging signal. For example, a maximum distance from a time when the first terminal sends the first ranging signal to a time when the SCI is sent, etc.

Physical layer parameter information used by an associated first ranging signal is indicated in transmission of the SCI.

The physical layer parameter information includes at least one of: the sending power indication of the first ranging signal; the BWP indication of the first ranging signal; the format of the first ranging signal; the priority information of the first ranging signal; the retransmission number of times of the first ranging signal; or the measurement precision requirement of the ranging.

At step 202, the first ranging signal is sent to the second terminal based on the transmission parameter.

The second terminal receives the first ranging signal based on the transmission parameter.

Optionally, the first terminal determines a first time difference based on sending of the first ranging signal, and the first time difference is a time difference between a moment when the first terminal sends the first ranging signal and a first terminal timing. The second terminal receives a second time difference when receiving a second ranging signal, and the second time difference is a time difference between a moment when the first terminal receives the first ranging signal and a second terminal timing.

Optionally, in response to the first terminal needing to acquire distance information with the second terminal, the first terminal determines the second time difference, and determines a distance with the second terminal based on the first time difference and the second time difference. Optionally, the first terminal receives the first ranging information sent by the second terminal, and the first ranging information includes the second time difference.

Although a core technical idea of the disclosure is described only by taking the sidelink control information as a specific example of the first indication information in the above content, it is merely for the purpose of an example, and is not intended to limit the scope of the disclosure. It's obvious for those skilled in the art that the first indication information may be a signaling that is applied to a field of sidelink communication and capable of carrying any indication information for the ranging signal.

In summary, according to the method for sending the ranging signal provided in the embodiments, the ranging signal may be transmitted between the first terminal and the second terminal based on the transmission parameter by determining the transmission parameter of the first ranging signal and sending the first ranging signal from the first terminal to the second terminal based on the transmission parameter, which reduces a processing complexity and an energy consumption of a receiving end compared with blind detection.

Figure 7:
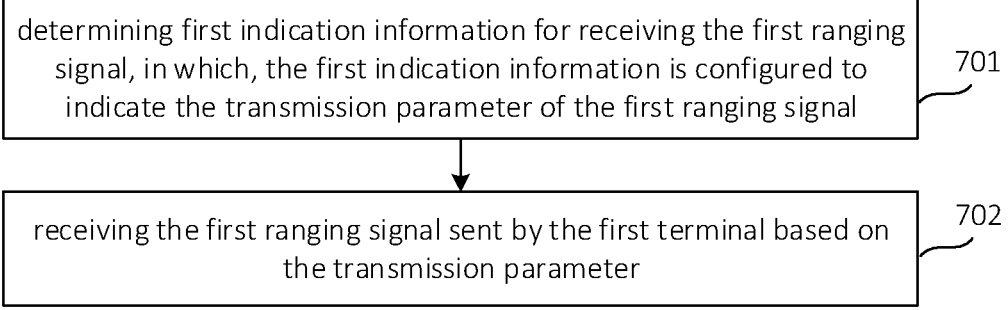
FIG. 7 is a flowchart illustrating a method for receiving a ranging signal according to some embodiments.

In an alternative embodiment, the method for receiving a ranging signal is illustrated by taking a receiving terminal as an example. As illustrated in FIG. 7, it is illustrated by taking the method being performed by a second terminal as an example. As illustrated in FIG. 7, the method includes the following step.

At step 701, first indication information for receiving the first ranging signal is determined. The first indication information is configured to indicate the transmission parameter of the first ranging signal.

The transmission parameter may include a time-frequency resource and/or a physical layer parameter for sending the first ranging signal.

Optionally, the first indication information indicates the transmission parameter in an explicit or implicit manner. Schematically, the first indication information indicates the transmission parameter of the first ranging signal by at least one of:

a first indication field in the first indication information (in an explicit indication manner); or, a first format corresponding to the first indication information (in an implicit indication manner); or, a first channel parameter corresponding to a physical layer channel for transmitting the first indication information (in an implicit indication manner), for example, a specified format corresponding to a demodulated reference signal of a physical layer channel for transmitting the first indication information; or, a specified sequence corresponding to a demodulated reference signal of a physical layer channel for transmitting the first indication information, etc.

When the second terminal determines the transmission parameter of the first ranging signal, it includes any one of the following situations.

First, the first terminal determines the transmission parameter of the first ranging signal, and indicates the transmission parameter to the second terminal.

In other words, the first terminal may generate first indication information for sending the first ranging signal, and send the first indication information to the second terminal.

That is, when the first terminal needs to determine a distance with the second terminal, the transmission parameter of the first ranging signal is determined first, and the first indication information is sent to the second terminal. The first indication information is configured to indicate the transmission parameter of the first ranging signal. Thus, the second terminal receives the first indication information sent by the first terminal, and determines the transmission parameter of the first ranging signal based on the first indication information.

Optionally, the first terminal determines the transmission parameter based on a ranging request sent by the second terminal; or, the first terminal determines the transmission parameter based on the ranging signal generated by the device.

Optionally, the first indication information is indicated by sidelink control information (SCI), that is, the first terminal sends the SCI to the second terminal. The SCI is configured to indicate the transmission parameter of the first ranging signal.

In an embodiment, the transmission parameter indicated by the first ranging signal includes control information indicating the first terminal to send the first ranging signal to the second terminal; and/or, resource information about a time-frequency resource occupied by the first ranging signal. Optionally, the transmission parameter may further include a physical layer parameter for transmitting the first ranging signal.

1.1 When control information indicates the first terminal to send the first ranging signal to the second terminal, the first indication information is indicated in an explicit indication manner or in an implicit indication manner.

When the first indication information is indicated in the explicit indication manner, the SCI may include a first indication field. The first indication field is configured to indicate whether the first terminal sends the first ranging signal to the second terminal. When the first indication information is indicated in an implicit indication manner, the SCI may have a corresponding first format. The first format is configured to indicate that the first terminal sends the first indication information to the second terminal. That is, when the SCI has a corresponding other format, it indicates that the first terminal does not send the first ranging signal to the second terminal. Alternatively, the physical layer channel for transmitting the SCI may have a corresponding first channel parameter. The first channel parameter is configured to indicate that the first terminal sends the first ranging signal to the second terminal. In other words, when the physical layer channel has corresponding other channel parameters, it indicates that the first terminal does not send the first ranging signal to the second terminal. Schematically, the demodulated reference signal of the physical layer channel for transmitting the SCI may have a corresponding second format. The second format is configured to indicate the first terminal to send the first ranging signal to the second terminal. That is, when the demodulated reference signal of the physical layer channel corresponds to other formats, it indicates that the first terminal does not send the first ranging signal to the second terminal. Alternatively, the demodulated reference signal of the physical layer channel for transmitting the SCI may correspond to a first sequence. The first sequence is configured to indicate that the first terminal sends the first ranging signal to the second terminal. That is, when the demodulated reference signal of the physical layer channel corresponds to other sequence, it indicates that the first terminal does not send the first ranging signal to the second terminal.

1.2 The transmission parameter of the first ranging signal includes resource information about a time-frequency resource occupied by the first ranging signal.

The indication of the time-frequency resource includes at least one of the following situations.

1.2.1 Resource information about the time-frequency resource occupied by the first ranging signal indicates a first frequency-domain resource used for transmission associated with the first indication information. The first ranging signal is transmitted via the first frequency-domain resource.

1.2.2 Resource information about the time-frequency resource occupied by the first ranging signal indicates a reserved time-frequency resource. The first ranging signal is transmitted via a part of the reserved time-frequency resource. The reserved time-frequency resource is a time-frequency resource used for a subsequent sidelink transmission.

1.2.3 Resource information about the time-frequency resource occupied by the first ranging signal indicates a second time-frequency domain resource. The second time-frequency domain resource is a time-frequency domain resource for transmitting the first ranging signal.

1.3 Physical layer parameter information used by an associated first ranging signal is indicated in transmission of the SCI.

Optionally, the second time-frequency resource is indicated based on a sidelink resource pool transmitting the first indication information; or, the second time-frequency resource is indicated based on a sidelink bandwidth part (BWP) transmitting the first indication information; or, the second time-frequency resource is indicated based on a resource index of a ranging resource.

Schematically, taking the first indication information being implemented as SCI as an example, sending of the SCI directly indicates a position and/or a size of the time-frequency domain resource used for transmission of the first ranging signal.

Optionally, the second time-frequency resource is indicated based on the sidelink resource pool of the SCI; or, the second time-frequency resource is indicated based on the sidelink BWP of the SCI; or, the second time-frequency resource is indicated based on the resource index of the ranging resource.

The physical layer parameter information includes at least one of: a sending power indication of the first ranging signal; a BWP indication of the first ranging signal; a format of the first ranging signal; priority information of the first ranging signal; a retransmission number of times of the first ranging signal; or a measurement precision requirement of the ranging.

Second, the second terminal sends the first indication information to the first terminal when determining the transmission parameter. The first indication information is configured to indicate the transmission parameter of the first ranging signal.

That is, when the second terminal needs to determine a distance with the first terminal, the transmission parameter of the first ranging signal is determined first, and the first indication information is sent to the first terminal. The first indication information is configured to indicate the transmission parameter of the first ranging signal. Thus, the first terminal determines the transmission parameter of the first ranging signal based on the second indication information received, and sends the first ranging signal based on the transmission parameter.

It needs to be noted that, the first indication information is implemented as schedule information sent by the second terminal to the first terminal, which is configured to schedule the first terminal to send the first ranging signal.

Optionally, the second terminal determines the transmission parameter based on a ranging request sent by the first terminal; or, the first terminal determines the transmission parameter based on the ranging signal generated by the device.

Optionally, the first indication information is indicated by sidelink control information (SCI), that is, the second terminal sends the SCI to the first terminal, and the first terminal receives the SCI sent by the second terminal. The SCI is configured to indicate the transmission parameter.

The content indicated by the first ranging signal includes control information indicating the first terminal to send the first ranging signal to the second terminal; and/or, resource information about the time-frequency resource occupied by the first ranging signal. The transmission parameter further includes a physical layer parameter for transmitting the first ranging signal.

Optionally, transmission of the first indication information indicates the time-frequency resource used by the first terminal to transmit the first ranging signal.

The indication of the time-frequency resource includes at least one of the followings.

2.1 Transmission of the SCI indicates the time-frequency resource information occupied by other sidelink transmission of the first terminal. The first ranging signal is transmitted via a part of the time-frequency domain resource. That is, it corresponds to the process 1.2.1.

2.2 Sending of the SCI directly indicates the time-frequency resource used by the first terminal to send the first ranging signal, which corresponds to the process 1.2.3.

2.3 Sending of the SCI indicates a limitation of the time-frequency resource for the first terminal to send the first ranging signal. For example, a maximum distance from a time when the first terminal sends the first ranging signal to a time when the SCI is sent, etc.

Physical layer parameter information used by an associated first ranging signal is indicated in transmission of the SCI.

The physical layer parameter information includes at least one of: a sending power indication of the first ranging signal; a BWP indication of the first ranging signal; a format of the first ranging signal; priority information of the first ranging signal; a retransmission number of times of the first ranging signal; or a measurement precision requirement of the ranging.

At step 702, the first ranging signal sent by the first terminal is received based on the transmission parameter.

The first terminal sends the first ranging signal based on the transmission parameter.

Optionally, the first terminal determines a first time difference based on sending of the first ranging signal, and the first time difference is a time difference between a moment when the first terminal sends the first ranging signal and a first terminal timing. The second terminal receives a second time difference when receiving a second ranging signal, and the second time difference is a time difference between a moment when the first terminal receives the first ranging signal and a second terminal timing.

Optionally, in response to the second terminal needing to acquire distance information with the first terminal, the second terminal determines the first time difference, and determines a distance with the second terminal based on the first time difference and the second time difference. Optionally, the second terminal receives the second ranging information sent by the first terminal, and the second ranging information includes the first time difference.

Although a core technical idea of the disclosure is described only by taking the sidelink control information as a specific example of the first indication information in the above content, it is merely for the purpose of an example, and is not intended to limit the scope of the disclosure. It's obvious for those skilled in the art that the first indication information may be a signaling that is applied to a field of sidelink communication and capable of carrying any indication information for the ranging signal.

In summary, according to the method for receiving the ranging signal provided in the embodiments, the ranging signal may be transmitted based on the transmission parameter between the first terminal and the second terminal by determining the transmission parameter of the first ranging signal and sending the first ranging signal from the first terminal to the second terminal based on the transmission parameter, which reduces the processing complexity and the energy consumption of the receiving end compared with blind detection.

Figure 8:
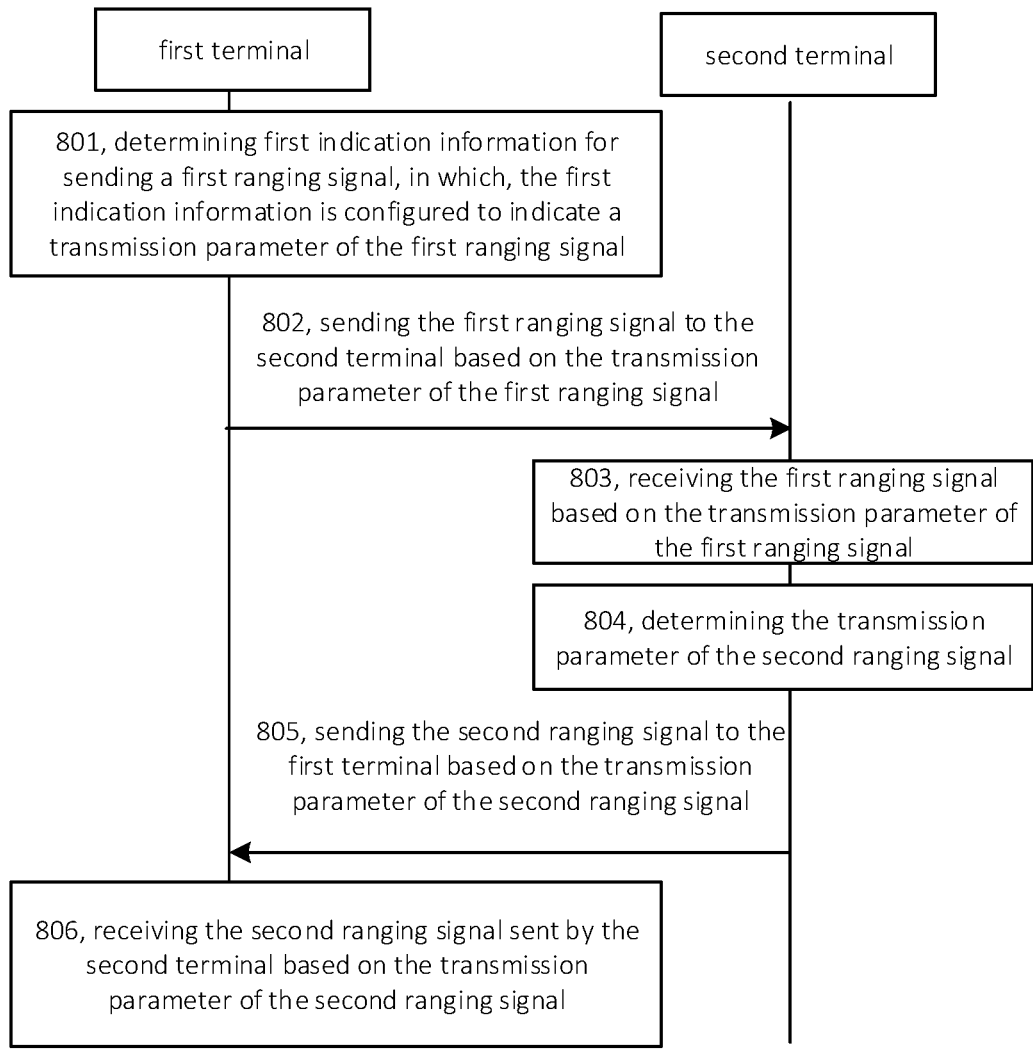
FIG. 8 is a flowchart illustrating a method for sending a ranging signal according to some embodiments.

In an alternative embodiment, when the first terminal sends the first ranging signal to the second terminal, the second terminal further needs to be scheduled to send the second ranging signal to the first terminal. FIG. 8 is a flowchart illustrating a method for sending a ranging signal according to some embodiments. As illustrated in FIG. 8, the method includes the following steps.

At step 801, the first terminal determines first indication information for sending a first ranging signal. The first indication information is configured to indicate a transmission parameter of the first ranging signal.

The transmission parameter may include a time-frequency resource and/or a physical layer parameter for sending the first ranging signal.

Optionally, the first indication information indicates the transmission parameter in an explicit or implicit manner. Schematically, the first indication information indicates the transmission parameter of the first ranging signal by at least one of:

a first indication field in the first indication information (in an explicit indication manner); or, a first format corresponding to the first indication information (in an implicit indication manner); or, a first channel parameter corresponding to a physical layer channel for transmitting the first indication information (in an implicit indication manner), for example, a specified format corresponding to a demodulated reference signal of a physical layer channel for transmitting the first indication information; or, a specified sequence corresponding to a demodulated reference signal of a physical layer channel for transmitting the first indication information, etc.

When the first terminal determines the transmission parameter of the first ranging signal, it includes any one of the following situations.

First, the first terminal itself determines the transmission parameter of the first ranging signal, and indicates the transmission parameter to the second terminal.

In other words, the first terminal may generate first indication information for sending the first ranging signal, and send the first indication information to the second terminal.

Optionally, the indication information is indicated by sidelink control information (SCI), that is, the first terminal sends the SCI to the second terminal. The SCI is configured to indicate the first indication information. The content indicated by the first ranging signal includes control information indicating the first terminal to send the first ranging signal to the second terminal; and/or, resource information about a time-frequency resource occupied by the first ranging signal. The transmission parameter further includes a physical layer parameter for transmitting the first ranging signal.

Second, the terminal receives the first indication information sent by the second terminal. The first indication information is configured to indicate the transmission parameter of the first ranging signal.

That is, when the second terminal needs to determine a distance with the first terminal, the transmission parameter of the first ranging signal is determined first, and the first indication information is sent to the first terminal.

In an embodiment, the transmission parameter indicated by the first ranging signal includes control information indicating the first terminal to send the first ranging signal to the second terminal; and/or, resource information about a time-frequency resource occupied by the first ranging signal. Alternatively, the transmission parameter may further include a physical layer parameter for sending the first ranging signal. That is, the transmission parameter is configured to indicate whether the first terminal sends the ranging signal to the second terminal, and/or, a time-frequency resource and/or a physical layer parameter of the first ranging signal sent by the first terminal to the second terminal.

At step 802, the first terminal sends the first ranging signal to the second terminal based on the transmission parameter of the first ranging signal.

Optionally, the first terminal determines a first time difference based on sending of the first ranging signal, and the first time difference is a time difference between a moment when the first terminal sends the first ranging signal and a first terminal timing. The second terminal receives a second time difference when receiving a second ranging signal, and the second time difference is a time difference between a moment when the first terminal receives the first ranging signal and a second terminal timing.

At step 803, the second terminal receives the first ranging signal based on the transmission parameter of the first ranging signal.

At step 804, the second terminal determines the transmission parameter of the second ranging signal.

Optionally, the first terminal further sends second indication information to the second terminal. The second indication information is configured to send the transmission parameter of the second ranging signal for the second terminal. Optionally, the SCI sent by the first terminal to the second terminal further indicates the second indication information. That is, the SCI sent by the first terminal to the second terminal further indicates the transmission parameter of the second ranging signal.

Optionally, the second indication information indicates the transmission parameter in an explicit or implicit manner. Schematically, the second indication information indicates the transmission parameter of the first ranging signal by at least one of:

a second indication field in the second indication information (in an explicit indication manner); or, a second format corresponding to the second indication information (in an implicit indication manner); or, a second channel parameter corresponding to a physical layer channel for transmitting the second indication information (in an implicit indication manner), for example, a specified format corresponding to a demodulated reference signal of a physical layer channel for transmitting the second indication information; or, a specified sequence corresponding to a demodulated reference signal of a physical layer channel for transmitting the second indication information, etc.

The transmission parameter of the second ranging signal includes control information indicating the second terminal to send the second first ranging signal to the first terminal; and/or, resource information about a time-frequency resource occupied by the second ranging signal. The transmission parameter further includes a physical layer parameter for transmitting the second ranging signal.

Optionally, a transmission time-frequency resource of the second ranging signal is determined as pre-agreed.

Optionally, the transmission time-frequency resource of the second ranging signal is determined based on the transmission parameter of the first ranging signal. For example, a time interval between the second ranging signal and the first ranging signal is indicated, or, a frequency domain initial position offset between the second ranging signal and the first ranging signal is indicated, or, an index difference between the second ranging signal and the first ranging signal is indicated; or, a minimum/maximum value of a time interval between the second ranging signal and the first ranging signal is indicated, etc.

The SCI sent by the first terminal to the second terminal correspondingly indicates physical layer parameter information used for transmission of the first ranging signal and the second ranging signal. The first ranging signal and the second ranging signal use the same physical layer parameters, and a set of physical layer parameters is indicated in the SCI; or, the first ranging signal and the second ranging signal use different physical layer parameters, and corresponding physical layer parameters are respectively indicated in the SCI.

At step 805, the second terminal sends the second ranging signal to the first terminal based on the transmission parameter of the second ranging signal.

The second terminal determines a fourth time difference, and the fourth time difference is a time difference between a moment when the second terminal sends the second ranging signal and a fourth terminal timing.

Optionally, the first terminal sends the first time difference and the third time difference to the second terminal. Optionally, when the second terminal needs to perform a distance detection, the second ranging information sent by the first terminal is received. The second ranging information includes the first time difference and the third time difference. Optionally, the first terminal may directly send values of the first time difference and the third time difference or may send a difference value between the first time difference and the third time difference when sending the first time difference and the third time difference.

At step 806, the first terminal receives the second ranging signal sent by the second terminal based on the transmission parameter of the second ranging signal.

Optionally, the first terminal determines the third time difference. The third time difference is a time difference between a moment when the first terminal receives the second ranging signal and a third terminal timing.

Optionally, the second terminal sends the second time difference and the fourth time difference to the first terminal. Optionally, when the first terminal needs to perform a distance detection, the first ranging information sent by the second terminal is received. The first ranging information includes the second time difference and the fourth time difference. Optionally, the second terminal may directly send values of the second time difference and the fourth time difference or may send a difference value between the second time difference and the fourth time difference when sending the second time difference and the fourth time difference.

Although a core technical idea of the disclosure is described only by taking the sidelink control information as a specific example of the first indication information in the above content, it is merely for the purpose of an example, and is not intended to limit the scope of the disclosure. It's obvious for those skilled in the art that the first indication information may be a signaling that is applied to a field of sidelink communication and capable of carrying any indication information for the ranging signal.

In summary, according to the method for sending the ranging signal provided in the embodiments, the ranging signal may be transmitted based on the transmission parameter between the first terminal and the second terminal by determining the transmission parameter of the first ranging signal and sending the first ranging signal from the first terminal to the second terminal based on the transmission parameter, which reduces the processing complexity and the energy consumption of the receiving end compared with the blind detection.

Figure 9:
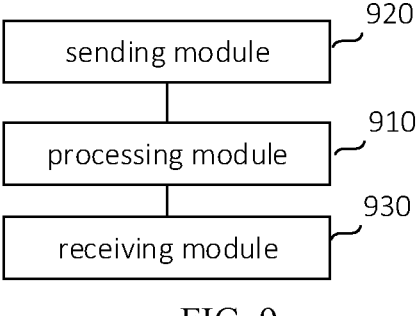
FIG. 9 is a block diagram illustrating a structure of an apparatus for sending a ranging signal according to some embodiments.

FIG. 9 is a block diagram illustrating a structure of an apparatus for sending a ranging signal according to some embodiments. As illustrated in FIG. 9, taking the apparatus being applied to a first terminal as an example, the apparatus includes a processing module 910 and a sending module 920.

The processing module 910 is configured to determine first indication information for sending a first ranging signal. The first indication information is configured to indicate a transmission parameter of the first ranging signal. The transmission parameter includes a time-frequency resource and/or a physical layer parameter for sending the first ranging signal.

The sending module 920 is configured to send the first ranging signal to a second terminal based on the transmission parameter.

In an alternative embodiment, the first indication information indicates the transmission parameter of the first ranging signal by at least one of:

a first indication field in the first indication information; or, a first format corresponding to the first indication information;

or, a first channel parameter corresponding to a physical layer channel for transmitting the first indication information.

In an alternative embodiment, the processing module 910 is further configured to generate the first indication information for sending the first ranging signal.

The sending module 920 is further configured to send the first indication information to the second terminal.

In an alternative embodiment, the sending module 920 is further configured to send sidelink control information (SCI) to the second terminal. The SCI is configured to indicate the transmission parameter of the first ranging signal.

In an alternative embodiment, the transmission parameter of the first ranging signal includes control information indicating the first terminal to send the first ranging signal to the second terminal.

In an alternative embodiment, the transmission parameter of the first ranging signal includes resource information about a time-frequency resource occupied by the first ranging signal.

In an alternative embodiment, the resource information about the time-frequency resource occupied by the first ranging signal indicates a first frequency-domain resource used for transmission associated with the first indication information. The first ranging signal is transmitted via the first frequency-domain resource.

In an alternative embodiment, the resource information about the time-frequency resource occupied by the first ranging signal indicates a reserved time-frequency resource. The first ranging signal is transmitted via a part of the reserved time-frequency resource. The reserved time-frequency resource is a time-frequency resource used for a subsequent sidelink transmission.

In an alternative embodiment, the resource information about the time-frequency resource occupied by the first ranging signal indicates a second time-frequency domain resource. The second time-frequency domain resource is a time-frequency domain resource for transmitting the first ranging signal.

In an alternative embodiment, the second time-frequency resource is indicated based on a sidelink resource pool transmitting the first indication information;

or, the second time-frequency resource is indicated based on a sidelink bandwidth part (BWP) transmitting the first indication information;

or, the second time-frequency resource is indicated based on a resource index of a ranging resource.

In an alternative embodiment, the apparatus further includes a receiving module 930.

The receiving module 930 is configured to receive the first indication information sent by the second terminal.

In an alternative embodiment, the receiving module 930 is further configured to receive sidelink control information (SCI) sent by the second terminal. The SCI is configured to indicate the transmission parameter of the first ranging signal.

In an alternative embodiment, the sending module 920 is further configured to send second indication information to the second terminal. The second indication information is configured to indicate sending a transmission parameter of a second ranging signal for the second terminal.

In an alternative embodiment, the transmission parameter of the second ranging signal includes control information indicating the second terminal to send the second ranging signal to the first terminal.

In an alternative embodiment, the transmission parameter of the second ranging signal includes resource information about a time-frequency resource occupied by the second ranging signal.

In summary, according to the apparatus for sending the ranging signal provided in the embodiments, the ranging signal may be transmitted based on the transmission parameter between the first terminal and the second terminal by determining the transmission parameter of the first ranging signal and sending the first ranging signal from the first terminal to the second terminal based on the transmission parameter, which reduces the processing complexity and the energy consumption of the receiving end compared with blind detection.

FIG. 10 is a block diagram illustrating a structure of an apparatus for receiving a ranging signal according to some embodiments. As illustrated in FIG. 10, taking the apparatus being applied to a second terminal as an example, the apparatus includes a processing module 1010 and a receiving module 1020.

The processing module 1010 is configured to determine first indication information for receiving a first ranging signal. The first indication information is configured to indicate a transmission parameter of the first ranging signal. The transmission parameter includes a time-frequency resource and/or a physical layer parameter for receiving the first ranging signal.

The receiving module 1020 is configured to receive the first ranging signal sent by the first terminal based on the transmission parameter.

In an alternative embodiment, the first indication information indicates the transmission parameter of the first ranging signal by at least one of:

a first indication field in the first indication information;

or, a first format corresponding to the first indication information;

or, a first channel parameter corresponding to a physical layer channel for transmitting the first indication information.

In an alternative embodiment, the receiving module 1020 is further configured to receive the first indication information sent by the first terminal.

In an alternative embodiment, the receiving module 1020 is further configured to receive sidelink control information (SCI) sent by the first terminal. The SCI is configured to indicate the transmission parameter of the first ranging signal.

In an alternative embodiment, the transmission parameter of the first ranging signal includes control information indicating the first terminal to send the first ranging signal to the second terminal.

In an alternative embodiment, the transmission parameter of the first ranging signal includes resource information about a time-frequency resource occupied by the first ranging signal.

In an alternative embodiment, the resource information about the time-frequency resource occupied by the first ranging signal indicates a first frequency-domain resource used for transmission associated with the first indication information. The first ranging signal is transmitted via the first frequency-domain resource.

In an alternative embodiment, the resource information about the time-frequency resource occupied by the first ranging signal indicates a reserved time-frequency resource. The first ranging signal is transmitted via a part of the reserved time-frequency resource. The reserved time-frequency resource is a time-frequency resource used for a subsequent sidelink transmission.

In an alternative embodiment, the resource information about the time-frequency resource occupied by the first ranging signal indicates a second time-frequency domain resource. The second time-frequency domain resource is a time-frequency domain resource for transmitting the first ranging signal.

In an alternative embodiment, the second time-frequency resource is indicated based on a sidelink resource pool transmitting the first indication information;

or, the second time-frequency resource is indicated based on a sidelink bandwidth part (BWP) transmitting the first indication information;

or, the second time-frequency resource is indicated based on a resource index of a ranging resource.

In an alternative embodiment, the processing module 1010 is further configured to generate the first indication information for receiving the first ranging signal.

the apparatus further includes a sending module 1030.

The sending module 1030 is further configured to send the first indication information to the first terminal.

In an alternative embodiment, the sending module 1030 is further configured to send sidelink control information (SCI) to the first terminal. The SCI is configured to indicate the transmission parameter of the first ranging signal.

In an alternative embodiment, the receiving module 1020 is further configured to receive second indication information sent by the first terminal. The second indication information is configured to indicate sending a transmission parameter of a second ranging signal for the second terminal.

In an alternative embodiment, the transmission parameter of the second ranging signal includes control information indicating the second terminal to send the second ranging signal to the first terminal.

In an alternative embodiment, the transmission parameter of the second ranging signal includes resource information about a time-frequency resource occupied by the second ranging signal.

In summary, according to the apparatus for receiving the ranging signal provided in the embodiments, the ranging signal may be transmitted based on the transmission parameter between the first terminal and the second terminal by determining the transmission parameter of the first ranging signal and sending the first ranging signal from the first terminal to the second terminal based on the transmission parameter, which reduces the processing complexity and the energy consumption of the receiving end compared with the blind detection.

FIG. 11 is a schematic diagram illustrating a structure of a terminal provided according to an example embodiment. The terminal includes a processor 1101, a receiver 1102, a transmitter 1103, a memory 1104 and a bus 1105.

The processor 1101 includes one or more processing cores, and the processor 1101 executes various function applications and information processings by running a software program or a module.

The receiver 1102 and the transmitter 1103 may be implemented as a communication component, which may be a communication chip.

The memory 1104 is communicatively connected to the processor 1101 via the bus 1105.

The memory 1104 may be configured to store at least one instruction, and the processor 1101 is configured to execute the at least one instruction to implement all steps in the above embodiment.

In addition, the memory 1104 may be implemented by any type of volatile or non-volatile storage devices or their combination. The volatile or non-volatile storage device includes but not limited to a magnetic disk or an optical disk, an electrically erasable programmable read-only memory (EEPROM), an erasable programmable read-only memory (EPROM), a static random access memory (SRAM), a read-only memory (ROM), a magnetic memory, a flash memory and a programmable read-only memory (PROM).

In some embodiments, a non-transitory computer readable storage medium is further provided which includes instructions, such as a memory including instructions. The instructions may be executed by the processor of the terminal to complete the method performed by a terminal side in the method for switching a device. For example, the non-transitory computer readable storage medium may be a ROM, a random access memory (RAM), a CD-ROM, a magnetic tape, a floppy disk, an optical data storage device, etc.

A non-transitory computer readable storage medium is further provided. When the instructions in the non-transitory computer readable storage medium are executed by the processor of a terminal, the terminal may perform the method for sending or receiving the ranging signal.

FIG. 12 is a block diagram illustrating a network device 1200 according to some embodiments. In some embodiments, the network device 1200 may be a base station.

The network device 1200 includes a processor 1201, a receiver 1202, a transmitter 1203 and a memory 1204. The receiver 1202, the transmitter 1203 and the memory 1204 are connected to a processor 1201 through a bus.

The processor 1201 include one or more processing cores, and the processor 1201 executes the method executed by the network device in the method for switching the device provided in embodiments of the disclosure by running a software program or a module. The memory 1204 may be configured to store a software program and a module. Specifically, the memory 1204 may store an operating system 1241 and an application module 1242 required by at least one function. The receiver 1202 is configured to receive the communication data transmitted by other devices, and the transmitter 1203 is configured to transmit the communication data to other devices.

A non-transitory computer readable storage medium is further provided. When the instructions in the non-transitory computer readable storage medium are executed by a processor of a network device, the network device may perform the method for sending or receiving the ranging signal.

A communication system is further provided in some embodiments of the disclosure. The system includes a terminal and a network device.

The terminal includes an apparatus for sending a ranging signal provided in embodiments as illustrated in FIG. 9, and an apparatus for receiving a ranging signal provided in embodiments as illustrated in FIG. 10.

A communication system is further provided in some embodiments of the disclosure. The communication system includes a terminal and a network device.

The terminal includes a terminal provided in the embodiments as illustrated in FIG. 11.

The network device includes a network device provided in the embodiments as illustrated in FIG. 12.

A computer readable storage medium is further provided in some embodiments of the disclosure. The computer readable storage medium stores at least one instruction, at least one program, a code set and an instruction set, the at least one instruction, the at least one program, the code set or the instruction set being loaded and executed by the processor to implement the steps executed by the terminal or the access network device in the method for sending and receiving a ranging signal provided in the each method embodiment.

The ranging signal may be transmitted between the first terminal and the second terminal based on the transmission parameter by determining the transmission parameter of the first ranging signal and sending the first ranging signal from the first terminal to the second terminal based on the transmission parameter, which reduces a processing complexity and an energy consumption of a receiving end compared with blind detection.

It should be understood that, "more" mentioned in this disclosure refers to two or more. "and/or", describes the relationship of the association objects, indicating that there may exist three relationships, for example, A and/or B, may represent: any of existing A only, existing both A and B, or existing B only. The character "/" generally means the contextual object is a kind of "or" relationship.

After considering the specification and practicing the disclosure here, those skilled in the art will easily think of other implementations. The application is intended to cover any variations, usages, or adaptive changes of the disclosure. These variations, usages, or adaptive changes follow the general principles of the disclosure and include common knowledge or conventional technical means in the technical field not disclosed by the disclosure. The description and the embodiments are to be regarded as examples only, and the true scope and spirit of the disclosure are given by the appended claims.

It should be understood that the disclosure is not limited to the precise structure described above and shown in the drawings, and various modifications and changes may be made without departing from its scope. The scope of the application is only limited by the appended claims. The scope of the application is only limited by the appended claims.

What is claimed is:

1. A method for sending a ranging signal, performed by a first terminal, the method comprising:
   determining first indication information for sending a first ranging signal, wherein the first indication information is configured to indicate a transmission parameter of the first ranging signal, wherein the transmission parameter of the first ranging signal comprises control information indicating whether the first terminal sends the first ranging signal to a second terminal, the transmission parameter of the first ranging signal further comprises a time-frequency resource and a physical layer parameter for sending the first ranging signal; and
   sending the first ranging signal to the second terminal based on the transmission parameter;
   wherein, determining the first indication information for sending the first ranging signal, comprises:
   generating the first indication information for sending the first ranging signal; and
   the method further comprising:
   sending the first indication information to the second terminal;
   wherein sending the first indication information to the second terminal comprises:
   sending sidelink control information (SCI) to the second terminal, wherein the SCI is configured to indicate the transmission parameter of the first ranging signal;
   wherein the method further comprises:
   sending second indication information to the second terminal, wherein the second indication information is configured to indicate sending a transmission parameter of a second ranging signal for the second terminal, the transmission parameter of the second ranging signal comprises control information indicating whether the second terminal sends the second ranging signal to the first terminal, the transmission parameter of the second ranging signal further comprises a physical layer parameter for sending the second ranging signal, a time-frequency resource for sending the second ranging signal is based on the time-frequency resource for sending the first ranging signal.

2. The method according to claim 1, wherein, the first indication information indicates the transmission parameter of the first ranging signal by at least one of following:
   a first indication field in the first indication information;
   a first format corresponding to the first indication information; or,
   a first channel parameter corresponding to a physical layer channel for transmitting the first indication information.

3. The method according to claim 1, wherein, determining the first indication information for sending the first ranging signal, comprises:
   receiving the first indication information sent by the second terminal.

4. The method according to claim 3, wherein, receiving the first indication information sent by the second terminal, comprises:
   receiving sidelink control information (SCI) sent by the second terminal, wherein the SCI is configured to indicate the transmission parameter of the first ranging signal.

5. The method according to claim 1, wherein, the transmission parameter of the second ranging signal comprises resource information about a time-frequency resource occupied by the second ranging signal.

6. The method according to claim 1, wherein, indication of a resource index is a frequency domain resource used by physical sidelink control channel (PSCCH) transmission carrying SCI.

7. The method according to claim 1, wherein, the transmission parameter of the first ranging signal comprises resource information about a time-frequency resource occupied by the first ranging signal.

8. The method according to claim 7, wherein, the resource information about the time-frequency resource occupied by the first ranging signal indicates a first frequency-domain resource used for transmission associated with the first indication information, wherein the first ranging signal is transmitted via the first frequency-domain resource.

9. The method according to claim 7, wherein, the resource information about the time-frequency resource occupied by the first ranging signal indicates a reserved time-frequency resource, wherein the first ranging signal is transmitted via a part of the reserved time-frequency resource, and the reserved time-frequency resource is a time-frequency resource used for a subsequent sidelink transmission.

10. The method according to claim 9, wherein in a case where the SCI comprises a current time-frequency resource and the reserved time-frequency resource, the SCI indicates whether the first terminal sends the first ranging signal to the second terminal in a current sidelink transmission and/or in the subsequent sidelink transmission, the current time-frequency resource is a time-frequency resource used for the current sidelink transmission.

11. The method according to claim 7, wherein,
   the resource information about the time-frequency resource occupied by the first ranging signal indicates a second time-frequency domain resource, wherein the second time-frequency domain resource is a time-frequency domain resource for transmitting the first ranging signal.

12. The method according to claim 11, wherein,
   the second time-frequency resource is indicated based on at least one of following:
   a sidelink resource pool transmitting the first indication information;
   a sidelink bandwidth part (BWP) transmitting the first indication information; or
   a resource index of a ranging resource.

13. The method according to claim 12, wherein the second time-frequency resource is indicated based on a sidelink bandwidth part (BWP) transmitting the first indication information.

14. The method according to claim 13, wherein the time-frequency resource for transmitting the first ranging signal uses a BWP used for transmitting the SCI, an offset value of a frequency domain initial position relative to the BWP indicates a frequency domain initial position of the first ranging signal, a subcarrier interval of the BWP used for transmitting the SCI indicates a frequency domain width occupied by the first ranging signal, and a transmission time interval between the first ranging signal and the SCI is indicated by a slot corresponding to the BWP and an OFDM symbol length.

15. A method for receiving a ranging signal, performed by a second terminal, the method comprising:
   determining first indication information for receiving a first ranging signal, wherein the first indication information is configured to indicate a transmission parameter of the first ranging signal, wherein the transmission parameter of the first ranging signal comprises control information indicating whether a first terminal sends the first ranging signal to the second terminal, the transmission parameter of the first ranging signal further comprises a time-frequency resource and a physical layer parameter for receiving the first ranging signal; and receiving the first ranging signal sent by the first terminal based on the transmission parameter;

wherein determining the first indication information for receiving the first ranging signal comprises:

receiving the first indication information sent by the first terminal;

wherein receiving the first indication information sent by the first terminal comprises:

receiving sidelink control information (SCI) sent by the first terminal, wherein the SCI is configured to indicate the transmission parameter of the first ranging signal;

wherein the method further comprises:

receiving second indication information sent by the first terminal, wherein the second indication information is configured to indicate sending a transmission parameter of a second ranging signal for the second terminal, the transmission parameter of the second ranging signal comprises control information indicating whether the second terminal sends the second ranging signal to the first terminal, the transmission parameter of the second ranging signal further comprises a physical layer parameter for sending the second ranging signal, a time-frequency resource for sending the second ranging signal is based on the time-frequency resource for sending the first ranging signal.

16. The method according to claim 15, wherein, the first indication information indicates the transmission parameter of the first ranging signal by at least one of following:

a first indication field in the first indication information;

a first format corresponding to the first indication information; or, a first channel parameter corresponding to a physical layer channel for transmitting the first indication information.

17. A terminal, comprising:

a processor;

a transceiver connected to the processor; and a memory configured to store an executable signaling of the processor;

wherein, the processor is configured to load and execute executable instructions to implement the method for receiving a ranging signal of claim 15.

18. A terminal, comprising:

a processor;

a transceiver connected to the processor; and a memory configured to store an executable signaling of the processor;

wherein, the processor is configured to:

determine first indication information for sending a first ranging signal, wherein the first indication information is configured to indicate a transmission parameter of the first ranging signal, wherein the transmission parameter of the first ranging signal comprises control information indicating whether the terminal sends the first ranging signal to a second terminal, the transmission parameter of the first ranging signal further comprises a time-frequency resource and a physical layer parameter for sending the first ranging signal; and send the first ranging signal to the second terminal based on the transmission parameter;

wherein the processor is configured to determine the first indication information for sending the first ranging signal, by:

generating the first indication information for sending the first ranging signal; and the processor is further configured to:

send the first indication information to the second terminal;

wherein the processor is further configured to send the first indication information to the second terminal, by:

send sidelink control information (SCI) to the second terminal, wherein the SCI is configured to indicate the transmission parameter of the first ranging signal;

wherein the processor is further configured to send second indication information to the second terminal, wherein the second indication information is configured to indicate sending a transmission parameter of a second ranging signal for the second terminal, the transmission parameter of the second ranging signal comprises control information indicating whether the second terminal sends the second ranging signal to the terminal, the transmission parameter of the second ranging signal further comprises a physical layer parameter for sending the second ranging signal, a time-frequency resource for sending the second ranging signal is based on the time-frequency resource for sending the first ranging signal.

* * * * *